US006580904B2

(12) United States Patent
Cox et al.

(10) Patent No.: US 6,580,904 B2
(45) Date of Patent: *Jun. 17, 2003

(54) METHOD OF PROVIDING DIRECTIONAL ASSISTANCE TO A MOBILE TELEPHONE SUBSCRIBER

(75) Inventors: Patrick M. Cox, Newberg, OR (US);
A. Peter Powell, Colton, OR (US);
Paul W. Filliger, Silverton, OR (US);
Michael A. Kepler, Aloha, OR (US);
Christopher A. Huey, Banks, OR (US)

(73) Assignee: Metro One Telecommunications, Inc., Beaverton, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 09/054,360

(22) Filed: Apr. 2, 1998

(65) Prior Publication Data

US 2002/0004382 A1 Jan. 10, 2002

Related U.S. Application Data

(60) Continuation-in-part of application No. 08/705,979, filed on Aug. 30, 1996, now Pat. No. 5,737,700, which is a continuation of application No. 08/527,437, filed on Sep. 13, 1995, now abandoned, which is a division of application No. 08/234,644, filed on Apr. 28, 1994, now abandoned.

(51) Int. Cl.[7] .......................... H04M 3/42; G08G 1/09; G08G 1/123; G01C 21/26; G01C 21/28

(52) U.S. Cl. .................. 455/414; 340/905; 340/995; 701/201; 701/208; 701/209

(58) Field of Search .................. 455/414; 701/201, 701/200, 208, 209; 380/49; 340/905, 995; 707/100

(56) References Cited

U.S. PATENT DOCUMENTS 5,570,283 A * 10/1996 Shoolery et al. ............ 364/407
5,668,880 A * 9/1997 Alajajian .................... 380/49

(List continued on next page.)

OTHER PUBLICATIONS

Yahoo.com, "Yahoo Maps", Aug. 16, 2001.*
Techmall, "OnStar Will Give You and Mom Peace of Mind While on the Road of Life", Apr. 23, 1998.*

(List continued on next page.)

*Primary Examiner*—William Cumming
(74) *Attorney, Agent, or Firm*—Kaye Scholer LLP (57) ABSTRACT

A wireless telephone subscriber who wishes directory assistance in the form of directions from one specified location to another is connected to a directory assistance agent. The subscriber identifies a destination location and any requested travel criteria. The directory assistance agent collects the subscriber's travel parameters and a routing algorithm on the server draws upon geographic, transportation, and related information stored on the server to generate an appropriate route to the destination location. The selected route may be divided into multiple segments. Directions according to each segment are provided to the subscriber. The subscriber may remain connected to the directory assistance center for all or any portion of the travel, may disconnect and reconnect as necessary, or may receive the entire route of travel in a single communication. Upon reconnection to a directory assistance agent while travelling, the subscriber is recognized as a travelling subscriber based on his MIN, ESN, or unique traveller identification number, and the agent is furnished with the subscriber's travel information and current location. The route of travel may be updated or amended as desired or as made necessary due to closed routes of travel, congestion, etc.

6 Claims, 7 Drawing Sheets

U.S. PATENT DOCUMENTS

| | | | | |
|---|---|---|---|---|
| 5,737,700 A | * | 4/1998 | Cox et al. | 455/414 |
| 5,847,663 A | * | 12/1998 | Chasek | 340/905 |
| 5,893,898 A | * | 4/1999 | Tanimoto | 701/201 |
| 5,948,040 A | * | 9/1999 | Delorme et al. | 701/201 |
| 5,953,722 A | * | 9/1999 | Lampert et al. | 707/100 |
| 5,987,381 A | * | 11/1999 | Oshizawa | 701/209 |
| 6,023,652 A | * | 2/2000 | Arakawa et al. | 701/201 |
| 6,023,653 A | * | 2/2000 | Ichimura et al. | 701/208 |
| 6,029,112 A | * | 2/2000 | Man et al. | 701/209 |
| 6,034,626 A | * | 3/2000 | Maekawa et al. | 340/995 |
| 6,208,934 B1 | * | 3/2001 | Bechtolsheim et al. | 701/209 |

OTHER PUBLICATIONS

Moore Cadillac, "Whenever you travel, wherever you may go, let OnStar reide along with you", Mar. 2, 2000.*

Russ, "OnStar: What is It?", The Auto Channel, Jan. 15, 1998.*

Fisher, "Model–based Systems Engineering of Autotive Systems", The AIAA/IEEE/SAE Digital Avionics System Conference, Oct. 31, 1998.*

Vartabedian, "Anytime Anywhere . . . We On Call", Techno–Talk, Sep. 1998.*

Holstein, "The Smart Car Revs Up", U.S. News and Work Report, Nov. 24, 1997.*

San Diego Insider.com, "Your Future behind the Wheel", Mar. 2, 2000.*

Menezes, Wireless Companies Plan Car Communication Device, Wireless Week, Nov. 11, 1996.*

General Motors, "Never leaving the Customer's Side", Jan. 1998.*

General Motors, "OnStar–First with Remote Diagnostics", Dec. 29, 1997.*

General Motors, "OnStar at a Glance", Dec. 29, 1997.*

* cited by examiner

METHOD OF PROVIDING DIRECTIONAL ASSISTANCE TO A MOBILE TELEPHONE SUBSCRIBER

RELATED APPLICATION DATA

The present application is a continuation-in-part of application Ser. No. 08/705,979, now U.S. Pat. No. 5,737,700, filed Aug. 30, 1996, which is a continuation of application Ser. No. 08/527,437, filed Sep. 13, 1995, now abandoned, which is a division of application Ser. No. 08/234,644, filed Apr. 28, 1994, now abandoned.

FIELD OF THE INVENTION

The present invention relates generally to the field of telecommunications and more specifically to directory assistance services. In particular, methods are provided for furnishing travel information to travelling telephone subscribers.

BACKGROUND OF THE INVENTION

Telephone directory assistance services have been available for the past century. While improvements have been made over the decades, such systems are still poorly suited for use by telephone subscribers, particularly subscribers of mobile telephone services.

In prior art directory assistance services, a customer dials an operator and identifies the name and address of a party whose telephone number is desired. The operator then locates the number, using printed directories or a computer database, and provides the number to the customer. (The provision of the number is sometimes done by a live operator, but more typically is done with a computerized voice response unit that provides a synthesized voicing of the number.) After the customer's inquiry has been satisfied, the connection to the operator is terminated.

While satisfactory for some customers, this arrangement is ill-suited for many wireless or mobile telephone customers. For one, such customers are usually away from their general work environments (e.g. in a vehicle), and thus may not have ready access to a pencil and paper in order to make a note of the desired number or other information provided by the directory assistance operator. Even if such materials are available, the customer may not find it convenient to interrupt other activities (e.g. driving), in order to make a note. In addition, the process of initiating a second call—whether to the same or a different desired party—entails multiple additional manual operations (e.g. hanging up, waiting for another dial tone, and dialing) which may be a hindrance to the customer's other activities.

SUMMARY OF THE INVENTION

The present assignee has redressed certain of these difficulties by providing a directory assistance service that eliminates the need to make a note of the desired number or undertake a redialing exercise. Rather than voicing a customer's desired telephone number to the customer after looking it up, a directory assistance agent (e.g., an operator) continues the call and connects the calling customer to the desired party. (The directory assistance agent may stay on the line as a conferenced party so as to provide further assistance, or may withdraw from the connection, depending on the particular implementation.) This arrangement obviates the need for the customer to make a note of the voiced number or to undertake a redialing exercise. However, if the initiated call is not completed (e.g., a "busy" tone is received), or if the customer desires further directory assistance, then the customer must again connect to the directory assistance operator to obtain additional help.

In accordance with one embodiment of the present invention, a directory assistance service is provided which alleviates many of these drawbacks of the prior art. For example, a customer who wishes directory assistance services is connected to a directory assistance agent, perhaps an operator, who determines the destination telephone number desired by the customer. The operator then connects the customer to the destination telephone number. However, rather than dropping all further involvement with the call, in this embodiment of the present invention the connection is continually monitored for several predetermined signals issued by the customer (e.g., those which are obtained by pressing the "*" or "#" buttons).

If the signal corresponding to the "*" key is detected, the tone triggered return transfer feature of the invention is invoked and the customer is transferred back to a directory assistance agent who can then provide whatever further assistance is needed (e.g., redialing a busy number, providing further directory assistance). By this arrangement, the press of a single button by the customer summons further directory assistance, rather than the redialing procedure required by the prior art.

The problems associated with providing directory assistance services to wireless and mobile (collectively termed "wireless" in this application) customers are not limited to hardships on the customers; the directory assistance service and the wireless carrier also confront unique issues. In some systems, for example, the wireless carrier (which is typically responsible for billing of the customer) knows only that the customer has dialed a directory assistance agent, but does not know the number to which the customer is ultimately connected by the agent. Billing is thereby complicated. In such systems, the toll charges (assuming toll calls are permitted; often they are not) for the connection between the customer and the desired number are simply absorbed by the directory assistance service, and recouped by billing the wireless carrier a sufficiently large flat rate charge for each directory assistance call so as to cover these costs. The wireless carrier then bills the subscriber a fixed amount for each directory assistance. inquiry, regardless of the toll charges of any further connection established for the customer by the directory assistance operator. This arrangement, however, has a number of disadvantages. In addition to increased cost, it also fails to provide the wireless carrier useful information about its customers' calling patterns, which may affect decisions relating to system expansion, etc.

Present embodiments of the invention described herein address the billing difficulties associated with completion of customer calls by directory assistance agents. According to these embodiments, the directory assistance service logs in a billing database information identifying the customer (i.e. the customer identification number accompanying the call from the wireless provider), the destination number to which the customer is connected, and the date, time and duration of the customer/destination number connection. This information is periodically provided to the wireless carrier, allowing it to bill the customer for the call connected by the directory assistance operator and recoup the associated expense. This permits the flat rate charged by the directory assistance agent to be reduced correspondingly, and provides the wireless service with more detailed information about its customers' usage requirements.

In other embodiments of the invention, directional assistance is provided to a telephone user. In one embodiment, a caller using a wireless telephone connects through a wireless switching office to a directory assistance center and a directory assistance agent, (e.g., an operator or a voice response unit ("VRU")) and specifies a desired destination. The caller's present location or the origination of the caller's desired travel is determined and the user identifies any special criteria for the trip, such as an aspiration to visit an historical landmark en route to the specified destination, a desire to take the most direct or most expeditious route, a desire to travel via railway or boat, etc. A routing algorithm determines an appropriate route from the caller's present position to the destination location, illustratively by referencing a database containing maps, transportation routes, construction information, etc. Before and during the travel, the route may be modified as necessary by a directory assistance agent or the routing algorithm to meet other travel criteria of the caller or to avoid traffic delays, construction, hazards, etc.

Depending on the length or complexity of the chosen route, it may be divided into multiple segments, with directions being provided for each segment as the caller proceeds along the route. The selected route is saved on a data server for later retrieval. The caller's travel route and criteria could, of course, be stored in another location that is equally accessible (e.g., a switch host computer or communication server). A placekeeper, which indicates the segment being travelled by the caller, is stored with the route and is updated as directions are provided.

The caller may remain connected to the directory assistance center for the duration of the trip or disconnect and reconnect as necessary or as desired. If the caller chooses to remain connected to the directory assistance center, he or she merely presses a predetermined key (possibly the "*" key) in accordance with a tone triggered return transfer feature of the invention to signal an operator or other directory assistance agent that he or she is ready to receive directions for the next segment of the route. Upon activation of the tone triggered return transfer feature, the caller may be returned to an agent different than the previous directory assistance agent. The placekeeper is thus retrieved with the route in order to inform other agents of a caller's travel status.

If the caller decides to disconnect while travelling a segment, he or she simply reconnects to the directory assistance center and a directory assistance agent when ready for the next segment of directions. To help make the provision of directions seamless in this connection/reconnection scenario, the stored route data also includes the caller's ANI (Automatic Number Identification), MIN (Mobile Identification Number), or a traveller identification number that is assigned to the caller. The switch host computer is illustratively configured such that when the caller reconnects, his or her ANI or MIN is automatically compared to those of travelling subscribers. If a match is found, then, when the call is transferred to an available directory assistance agent, the travel record is also passed. If a traveller identification number is assigned to the caller, he or she may provide this to the directory assistance agent that answers the reconnection, may enter the number via the caller's telephone keypad, or may speak the number for detection by a voice decoder.

Depending upon the distance travelled by the caller, his or her call(s) for directional assistance may be handed off to subsequent wireless switching offices and/or directory assistance centers.

The chosen directions are provided to the caller in any of several formats. In one embodiment, one or more directory assistance agents voice, in turn, the directions for each segment. The directions could, however, be sent to the user via such conduits as e-mail or facsimile. In other embodiments, directions are provided to travelling callers via pager, personal data assistants ("PDA"), or a wireless telephone that is equipped with a PDA. Other useful methods of providing the directions include voicing each segment's directions by a VRU, forwarding the directions in voicemail, or sending an SMS (Short Messaging Service) message via PCS (Personal Communication Services) equipment, small computer, etc.

Depending upon the device used by the caller to receive directions, the entire route may be transmitted all at once, and stored on the device, or may be transmitted in multiple segments. The device may also allow the caller to switch between different segments of the route depending upon how they are provided to him or her and how they are stored.

BRIEF DESCRIPTION OF THE DRAWINGS

The foregoing and additional objects, features, aspects and advantages of the present invention will become more readily apparent from the following detailed description, which proceeds with reference to the accompanying drawings, in which.

DETAILED DESCRIPTION

The following embodiments of the invention are described in the illustrative context of a directory assistance center providing directory assistance, including travel information and directions, to a wireless telephone user. Those skilled in the art, however, will recognize that the disclosed methods and structures are readily adaptable for broader applications.

Figure 1:
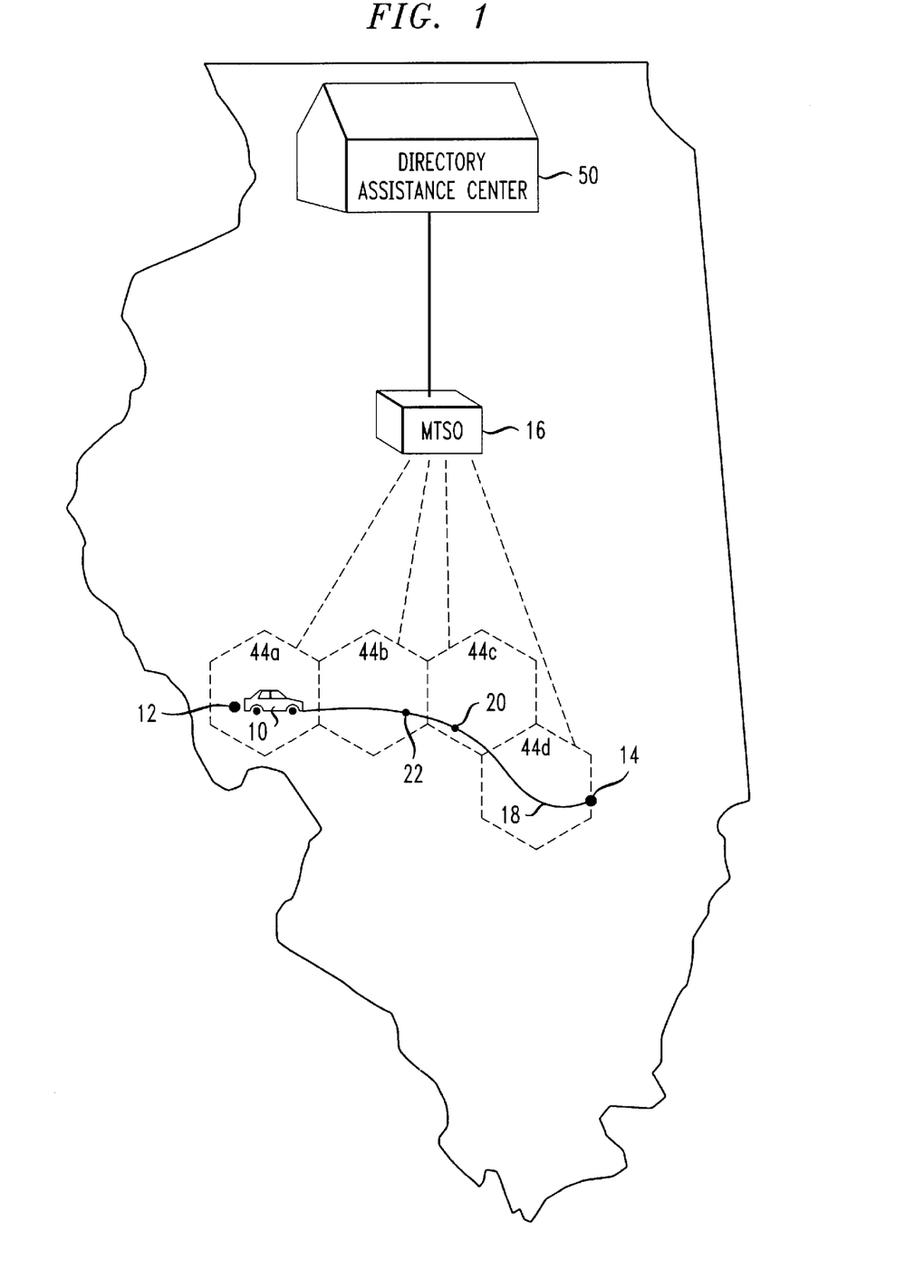
FIG. 1 depicts the use of an illustrative embodiment of the present invention to guide a caller in a trip.

With reference now to FIG. 1, a wireless telephone user or caller 10 in a first location 12 desires to travel to a second location 14. From his or her wireless telephone, user 10 initiates a call to directory assistance center 50 in order to obtain directional assistance to guide the caller from first location 12 to second location 14. The call is received by Mobile Telephone Switching Office ("MTSO") 16 and is switched to directory assistance center 50 over a multichannel communication link. MTSO 16 serves cell site 44a in which the caller is presently located. Directory assistance center 50 is described in detail below, with reference to FIG. 2.

At directory assistance center 50, the call is connected to a switch and from the switch is routed to a directory assistance agent (e.g., an operator or a voice response unit ("VRU")). Caller 10 states his or her need for directions or travel assistance and identifies second location 14. The caller may also identify his or her first position 12, or, as described below, directory assistance center 50 may independently determine the caller's present position from information forwarded in the call stream from MTSO 16.

Drawing upon geographic data, travel information and routing algorithms stored on one or more data servers in directory assistance center 50, a travel route 18 from first location 12 to second location 14 is generated. Travel criteria may be specified by caller 10, such as a visit to historical landmark 20 or scenic vista 22, and are incorporated into route 18. The generated travel route 18 is stored on a data server in directory assistance center 50 with a placekeeper to reference the caller's present location or area (e.g., before the travel commences, the placekeeper references first location 12).

Directions according to travel route 18 may be provided to caller 10 by the directory assistance agent all at once or may be segmented, with each segment provided in turn. In FIG. 1, travel route 18 is illustratively divided by the length of time estimated to be necessary to travel each segment. For example, travel route 18, when traversed via automobile, is provided to caller 10 in segments expected to take a specified number of minutes (illustratively, 15) to navigate. Alternatively, travel route 18 is divided according to turns or changes in direction. In this alternative, a new segment is begun every time the travelling caller 10 turns onto a new highway, road, or other traffic artery.

In a present embodiment of the invention, when the caller is ready for a segment of the travel route a directory assistance agent transmits the corresponding directions (e.g., North on I-880, South on I-5, etc.) in the form and format specified by caller 10. The directions may be provided in electronic or hard-copy form. They may be voiced, faxed, e-mailed or voice-mailed, sent by pager or PCS, transmitted via the internet or other wired or wireless communication path, etc. User 10 may receive the directions with any suitable equipment, such as a wireless telephone, fax-capable receiver, computer, personal data assistant ("PDA"), pager, etc.

One or more segments of route 18 may be stored at a time in the caller's receiving device. If multiple segments are received and stored, user 10 may browse the previous, present and future segments as desired.

It is envisioned that the caller may either disconnect from directory assistance center 50 after each segment of route 18 is provided and reconnect when the next segment is required, or may remain connected throughout multiple or all segments of his or her travel. As user 10 travels route 18, his or her voice communications with directory assistance center 50 are handed off to succeeding cell sites 44b–44d as necessary. Although FIG. 1 depicts a local or regional trip by the traveller, the present invention is readily adaptable for use in long-distance trips as well. One skilled in the art could easily modify the presently-described embodiment for such purpose from the description provided herein.

Figure 2:
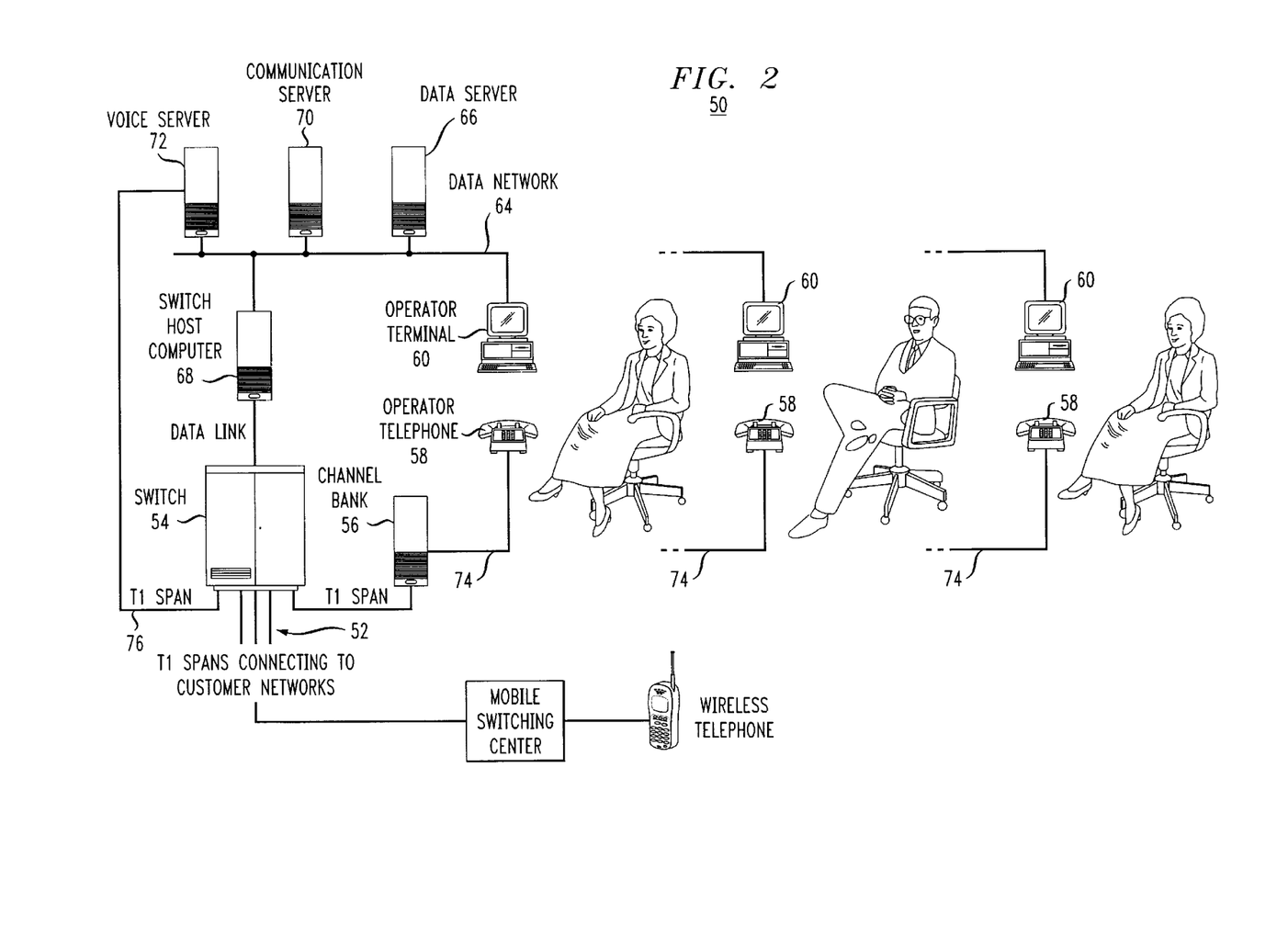
FIG. 2 is a block diagram depicting a directory assistance center that may be used to implement the embodiment featured in FIG. 1.

With reference now to FIG. 2, a directory assistance center 50 according to one embodiment of the present invention includes one or more links 52 for connection to customer networks, a private branch exchange ("PBX") or switch 54, and a channel bank 56 for coupling to a plurality of operator telephones 58. The embodiments of the invention described below refer to links 52 as standard T1 links although one skilled in the art will recognize that other communication links, such as Common Channel Signalling System 7 ("CCSS7") or Integrated Services Digital Network ("ISDN"), may be used.

Each operator is equipped with a terminal 60 that includes a video display unit and a keyboard with associated dialing pad. The operator terminals are coupled to data network 64 via a network connection which may be a terminal server, a network interface unit, etc. Data network 64 connects to one or more data servers 66, one or more switch host computers 68, one or more communication servers 70, and one or more voice response units ("VRU") 72.

The T1 links 52 provide connection between the directory assistance center 50 and wireless carriers' switching centers, such as Mobile Telephone Switching Offices ("MTSO") and Mobile Switching Centers ("MSC"). The T1 links 52 connect to the switching centers and/or networks from which calls are received and over which outgoing calls are placed (which network may be the same as or different than that used for incoming traffic).

Switch 54 is conventional and its operation is governed by instructions stored in switch host computer 68. These instructions implement the processes hereafter described. In this embodiment, the switch supports digital T1 telephone circuits while in other embodiments other switches can, of course, be used. Included in the switch is digital signal processing circuitry which provides the requisite conference capability (described below), and dual tone multi frequency ("DTMF") and multi frequency ("MF") tone generation and detection capabilities.

Calls routed to directory assistance center 50 from wireless switching centers and MTSOs include in each call stream the caller's Mobile Identification Number ("MIN") or Electronic Serial Number ("ESN"), each of which uniquely identifies a caller's communication device (the term MIN is used herein to refer to whichever number identifies the caller's device). In addition to, or in place of a MIN or ESN, a traveller identification number may be assigned by directory assistance center 50 to callers receiving directional assistance.

The call stream may also contain other data useful to directory assistance center 50. For example, when a caller requests directional assistance, the starting point of the travel must be identified. The current location of the caller may be electronically coded (e.g., by the MTSO servicing the caller's area) and included in the call stream received from the MTSO or switching center. The location information may, for example, comprise the area code and identification of cell site 44a. Or, the caller's general position may be received by identifying the trunk from which the call originated and mapping this against a geographical area served by that trunk. The MTSO or switching center may, in another alternative, determine a caller's location by triangulating signals transmitted between a caller's wireless device and multiple cell sites.

Instead of receiving call origination location data in the call stream, directory assistance center 50 could receive the information in an out-of-band transmission from the subscriber's wireless carrier. Possible methods by which this may be done include Transactional Capability Application Part ("TCAP")—perhaps using a CCSS7 link—or a network or asynchronous connection to the wireless carrier. Global Positioning Satellite ("GPS") or other satellite-provided data is another possible source of the information and may be received from the wireless carrier or a third party (e.g., the manufacturer of the subscriber's wireless device or a third party information provider). Out-of-band transmissions may be received through appropriate connections (e.g., serial, network, T1, satellite, etc., which are not shown in the Figures) to switch 54, host computer 68, data server 66, or communication server 70.

Incoming directory assistance calls received by switch 54 are connected, in a present embodiment of the invention, to an available operator via a T1 circuit 74 that is connected through the channel bank 56 to an operator's telephone headset. If no operator is available when a call is received, the call is queued until an operator becomes available. The queuing and call distribution scheme employs standard Automatic Call Distribution ("ACD").

The network connection that interfaces the operator terminals 60 with the data network 64 allows the terminals to operate as devices on the network and to communicate with other network devices and components.

Data servers 66 provide operators with the means to search for directory assistance information such as a customer's desired party or requested telephone number. As described below, operators also use data servers 66 to generate routes of travel and to provide directional assistance. In one embodiment, the data servers provide the capability to search for a desired party not just by name and address, but also by type of goods/services and/or geographical region. (E.g., the database can answer queries soliciting the names/numbers of shops carrying model rocketry supplies in southeast Portland, Oreg., or of Chinese restaurants on a given street.) Data indexed in this fashion is usually not commercially available, so the present assignee starts with a commercially available database file (e.g., the Directory Assistance Database Source available from U.S. West),and enriches it by adding further data by manual or other methods.

Present embodiments of the invention employ a relational database for storing and manipulating information, such as is available from Sybase. However, much simpler software can alternatively be used, such as DBase 4.

When preparing to execute a query on data server 66, an operator typically completes appropriate forms displayed on his or her terminal 60. These forms request various items of information from the operator and/or caller that are used by data server 66 to construct and execute its search. Forms used for directory assistance, (e.g., to find all shops selling rocketry supplies) are different than those used to provide directions (e.g., to generate a route from Portland to Seattle).

Desirably, the results of a directory assistance database search for a desired party, which are presented on the operator's terminal 60, are not alphabetized prior to display, but rather are presented in the order located by the database search engine. If desired, a deliberate randomization or weighting of order could be effected before display. Businesses at the beginning of the alphabet are thereby not unduly favored by customers using the directory assistance service.

As mentioned above, in addition to directory assistance information, data servers 66 also store information used to provide directions to guide a caller from his or her present location to a destination location. Such information comprises maps and other geographical or navigational information concerning various transportation routes, such as roads (including different types such as freeways, toll roads, unpaved roads, one-way streets, etc.), railways, airports, seaports, etc. Other useful information stored on data servers 66 may include locations of road work, construction or similar activity, hazards, traffic reports, weather reports, police and other emergency activity, and travel criteria such as scenic vistas, the availability of necessary services (e.g., food, gas, lodging, medical care and other emergency services), landmarks, points of general interest, etc.

This information is used to determine an appropriate route for the caller depending upon his or her desires—such as wishing to travel by the fastest route, the most direct or most scenic route, the least congested route, etc. The caller may wish to travel on highways as much as possible, or maybe only on back roads. He or she may wish to incorporate multiple modes of travel—such as automobile, boat, train, plane, bus, etc.

The geographic database or databases on data server 66 store geographically-encoded location data that is manipulable by routing algorithms executed on the data server. For example, an illustrative geographic database for providing directions to subscribers may comprise coded data corresponding to all intersections, street addresses and landmarks in a given city. Using the codes corresponding to a first and second location, plus transportation routing data as described above, a routing algorithm on data servers 66 generates a route from the first to the second location. By drawing upon the other travel criteria described above, the route can be tailored to a caller's particular needs or desires. Commercial mapping data may be used. For example, that which is provided by Etak, Inc. is satisfactory for the presently illustrated embodiment.

Communication servers 70 provide communication connections through which data may be passed to subscribers and other recipients. Communication servers 70 may operate according to their own stored instructions or in cooperation with data servers 66, switch host computer 68, and/or VRU 72. A primary function of a communication server 70 is to forward travel directions to subscribers who prefer, or find it necessary, to download or receive their directions in some form other than voice. As described below, by downloading the directions a subscriber may be able to follow or review the directions at his or her leisure.

Each communication server 70 performs one or more of the following illustrative functions: SMS or other form of paging, facsimile transmissions, e-mail service, graphical data service (e.g., browsing), data "pushing" or channel broadcasting (via the internet or other network), etc. SMS, or Short Messaging Service, is a paging protocol used by pagers and digital wireless telephones and allows transmission of alphanumeric characters. Illustratively, when using SMS technology, each segment of the route is provided via a separate page. Other forms of paging, in which binary or digital information is transmitted (e.g., Telocator Alphanumeric Protocol, or TAP) are also suitable.

Some mechanisms for transmitting or downloading directions (e.g., via VRU, voicemail, paging, internet download) offer the advantage of allowing the caller to store multiple segments of the travel route, or the entire travel route, at once. The multiple segments can then be accessed or browsed as the recipient sees fit. By receiving multiple or all segments; at once (e.g., electronic download to a computer or PDA, multiple pages to a paging device, voice recorder), the caller can minimize his or her connection costs to directory assistance center 50.

The caller illustratively interacts with his/her device (e.g., mobile telephone, pager, web browser, PDA) by voice or by manipulation of the device's controls. For example, where multiple segments are stored on the device, the travelling caller presses a first key (e.g., the "1" key) of the device or voices a first command (e.g., "back") to hear or view the directions according to a previous segment, and presses a second key (e.g., the "3" key) or voices a second command (e.g., "forward") to hear or view the directions for a subsequent segment. In a similar manner, other features of the caller's device may be employed.

The number of communication servers 70 within directory assistance center 50 is typically dictated by the actual or expected volume, of travel directions to be transmitted to subscribers in a form other than voice.

Communication servers 70 connect to subscribers through several possible means. Communication server 70 may be connected to the internet or other data connection (such as a serial, T1, satellite or other wireless data link) or network, or may be connected to a telephone link (e.g., through switch, 54) in order to send facsimiles and pages.

In an alternative embodiment to directory assistance center 50 pictured in FIG. 2, the functions of communication servers 70 are performed by switch host computer 68, data server 66 and/or VRU 72.

The form in which directions are to be provided to the travelling subscriber (e.g., voice, facsimile, e-mail, paging, etc.) is one of the criteria specified by the subscriber. As mentioned elsewhere, other criteria include the origination and ultimate destination of the travel, intermediate destinations, traveller preferences, etc. These criteria are recorded on a form completed by the operator at his or her terminal 60. If the subscriber does not have a preference, a default is selected (e.g., the default method of providing directions may be voice, which can be provided by either a human operator or VRU 72).

The voice response unit ("VRU") 72 is incorporated into the system to, among other functions, play the constantly repeated parts of an operator's speech, particularly the various greetings and signoffs (or closings). Not only does this provide a voice-saving and monotony-relief function for the operators, it performs a 'branding' function (i.e. the pre-recorded messages incorporate the name of the telephone company through which the customer was routed to the directory assistance service) and also reduces the amount of time an operator is actually connected to a customer.

VRU 72 is connected via the data network 64 to the switch host computer 68 and via one or more VRU data links 76 (each of which is illustratively comprised of a T1 span) to the switch 54 itself. More than one VRU can exist in a system. At appropriate stages in the progression of a call, the switch host computer 68 initiates a voice path connection (using a VRU data link 76) between the VRU and the switch such that the caller, or the caller and the operator, are able to hear whatever directions or pre-recorded speech is played on that circuit by the VRU. The switch host then instructs the VRU, via the data network, of the type of message to play and passes data parameters that enable the VRU to locate the message appropriate to the call state, the service-providing telephone company, and the operator. The recording density used is high enough to provide a good enough quality of message playback that most users of the system should be unaware they are listening to a recording.

There is overlap between the duties and functions of human operators and VRUs. Therefore, the term "directory assistance agent" is often used herein when describing features that may involve action by, or interaction with, either a human operator or VRU. As described above, for example, when a caller requests directional assistance and a travel route is selected, VRU 72 may be used in place of a human operator to voice the directions to the user, either for the entire route or some portion or portions thereof.

METHOD OF OPERATION

Customers of a particular telephone company simply dial the access digits established for directory assistance by that company. Examples of typical access digits are "411," "#555" and "555-1212."

The participating telephone company's own switching system then reroutes the call to the directory assistance service center 50 (illustratively via a T1 channel), where it appears as an incoming call.

Automatic Call Distribution ("ACD") logic is used to queue (if necessary) and distribute calls to directory assistance agents in the order in which calls are received and in a manner such that the call traffic is distributed evenly among them. Callers requesting directions may be routed to a separate subset of directory assistance agents that are more experienced in providing directions, more knowledgeable concerning the caller's present location or route of travel, or that possess more efficient connections to data servers 66 where the travel data is stored and routes of travel are generated.

When a call is connected to an operator, VRU 72 (also conferenced into the call) plays a greeting message using a message pre-recorded by the connected operator. Both the operator and the calling customer hear the message, which incorporates the name of the service or company to which the customer is a subscriber (in other words, the call is "branded"). The message ends with a prompt, thus cuing the customer to volunteer the information he or she is seeking or the destination to which he or she requires directions.

When the automated greeting is complete, the VRU is disconnected, and the operator and the customer are left connected by a 2-way speech path. At this point, the caller is interacting with a live operator.

In the event that the VRU is non-functional (for whatever reason), the incoming call is connected to the operator and a short "trill," or "zip" tone is played to indicate that a caller is on the line. (Note that once operators are logged in to the system, they wear headsets, and have their telephones 58 permanently off-hook. Their telephones do not ring when a call is presented). The operator then speaks a greeting and prompt in real time, instead of the VRU playing a message.

If the caller requests information concerning, for example, local theater performances, the operator speaks a response based on data made available by the system, which may include electronic or hard copy information. At this point, the caller will be released from the call, and the operator becomes available to handle further calls.

If the caller is seeking directory assistance in the form of a connection to a desired party, the operator will engage in live dialogue, as necessary, to establish the name and other pertinent information of the wanted party, and then initiate a database search using the operator terminal 60 and associated data server 66. In the event of an unsuccessful search, the operator will use alternative sources, such as the Electronic White Pages ("EWP") or even printed directories.

When connecting the caller to his or her wanted party, the operator may use one of two possible methods of call transfer: Blind Transfer or Hotline Transfer.

In either case, the call transfer is invoked by sending a sequence of digits (which includes the wanted party's number) to the switch host computer 68. The conventional method of doing this is simply dialing the digits on the operator's telephone handset (having first depressed the "flash" key to obtain dial tone). This method is always available. A much quicker and more accurate method is generally preferred: the operator highlights the desired database entry on the screen of the terminal 60, and then initiates Blind or Hotline transfer to that number by entering one or more keystrokes on the terminal keyboard. In this case, the data server 66 transmits the same digit sequence as part of a message to the switch host computer 68, via the network 64.

"Blind Transfer" is the normal means by which an operator establishes a connection between the caller and the wanted party's number. If the VRU is not available, the operator speaks a signoff message before initiating the transfer. If, however, the VRU 72 is operational, it is commanded to play the signoff message (pre-recorded by the just-released operator). The VRU status is known by whether the call was initiated by a VRU-played greeting, or by zip tone. As soon as the switch host computer 68 receives the Blind Transfer command (whether from the data server 66 or the operator's telephone set 58), an attempt is made to establish a route out of the switch 54. If successful, the circuit is seized and the address digits propagated, using the protocol the circuit is configured for; the operator is then released from the call and made available to receive further calls.

Like Blind Transfer, the "Hotline Transfer" method of establishing a connection between the caller and the wanted party's number can be initiated by the operator from either the telephone handset 58 or from the data terminal 60 keyboard. The difference is that the operator is not automatically released from the call in a Hotline Transfer. Instead, he/she is conferenced into the call by the switch 54 and is able to monitor its progress. Using either the telephone handset or the data terminal keyboard, the operator may withdraw from the call after verifying its establishment, or may cause the called circuit to be released and then re-engage in dialogue with the caller.

Hotline Transfers are used when a caller requests that the operator "stay on the line." In addition, however, failed routing attempts cause reorder tones to be returned to the operator's handset (in which case the caller is reconnected to the operator) or an error indication to be returned to the data server 66 (depending on how the switch host computer received the transfer command).

If, after initiation of a transfer (whether or not it succeeds), and at any time before the caller hangs up, the caller requires further operator assistance, the caller can perform a tone signal triggered, return transfer back to an operator (hereafter referred to as "tone triggered return transfer"). This is done simply by pressing the "*" (star) key on the caller's telephone once or twice (depending on the system, and as instructed by the operator in the signoff message).

The star tone(s) is detected by a DTMF receiver (allocated in the switch 54 for the entire duration of the call), and causes the caller to appear as a "return" call to the ACD logic—with higher priority than a "fresh" caller. This in turn results in the caller being connected to an available operator, whereupon the switch host computer 68 instructs the connected VRU 72 to play the appropriate pre-recorded message with return transfer instructions. Note that the operator to whom the call is connected is allocated according to the ACD algorithm, and may or may not be the same operator that previously handled the call. From this point, the call is treated in the same way as a non-tone triggered return transfer call, except that the operator receiving a return call also receives data concerning the caller's preceding connection, including the previous destination telephone number, the status of the connection attempt to that destination number, the identity of the previous operator, etc.

The tone triggered return transfer feature enables callers who have been transferred by means of a Blind Transfer to recall an operator if the transfer does not complete satisfactorily (for example, receipt of reorder tone, busy tone, operator intercept tri-tones, ring-no-answer, silence, or wrong number). It also enables a caller to request a follow-on call at the completion of a successfully completed call without incurring the delay or difficulty of re-dialing into the system.

It will be recognized that, in the present embodiment, the desired number may not be voiced to the customer unless explicitly requested. Sometimes a customer uses the tone triggered return transfer feature to request that the number be voiced if, for example, he finds a follow-up call will be necessary later.

Figure 3:
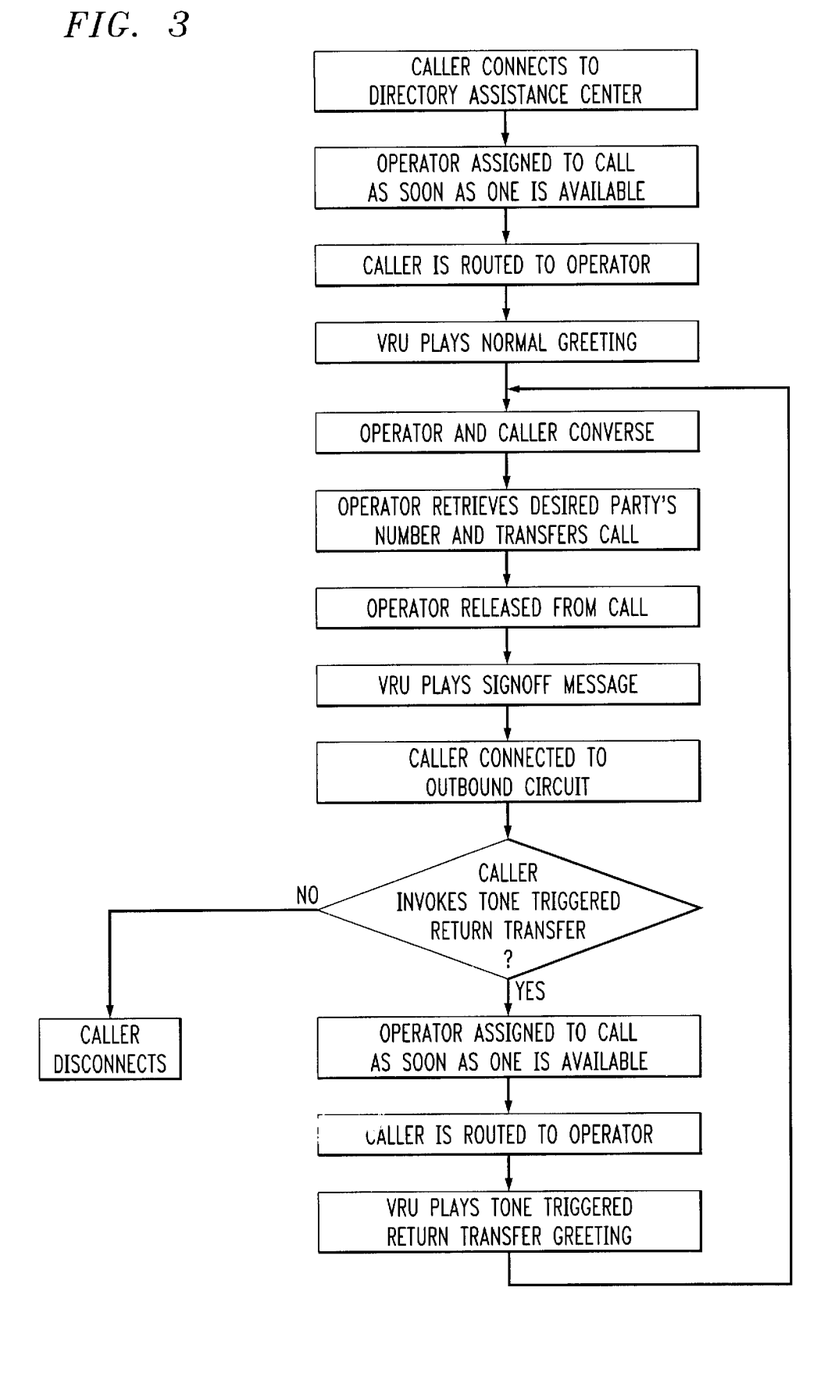
FIG. 3 is a flow chart depicting the process by which non-directional directory assistance is provided to a customer in accordance with one embodiment of the invention.

A flow diagram illustrating one possible sequence of events in a directory assistance system employing the present tone triggered return transfer technique is provided in FIG. 3.

The tone triggered return transfer technique enables the cost-effective provision of many services not previously available. For example, a directory assistance center may offer mapping/locator services in order to provide spoken directions to vehicle-based customers from their present location to a desired destination. To obviate the need for the customer to write the directions down while in the vehicle, a directory assistance agent should be available to issue instructions along the course of the vehicle's route. By using the tone triggered return transfer feature, the customer can receive initial instructions and thereafter summon further instructions as needed along the route simply by pressing the star (i.e., "*") key. In such a system, the customer's connection to the directory assistance center may be maintained during the course of the trip, but the agent can attend to other customers while the travelling customer doesn't need the agent's immediate attention. Since tone triggered return transfer may return the customer to a different agent, provision is made for transferring—with the customer—a pointer to the particular database record or travel route (i.e., in a map or set of directions) being utilized for that customer, and a pointer or placekeeper to a current location within that record or travel route. By this arrangement, a different agent who is summoned for assistance using the tone triggered return transfer feature can pick up where the last agent left off. While driving between agent instructions, the customer may, as one option, simply be kept in a "hold" state.

Figure 4A:
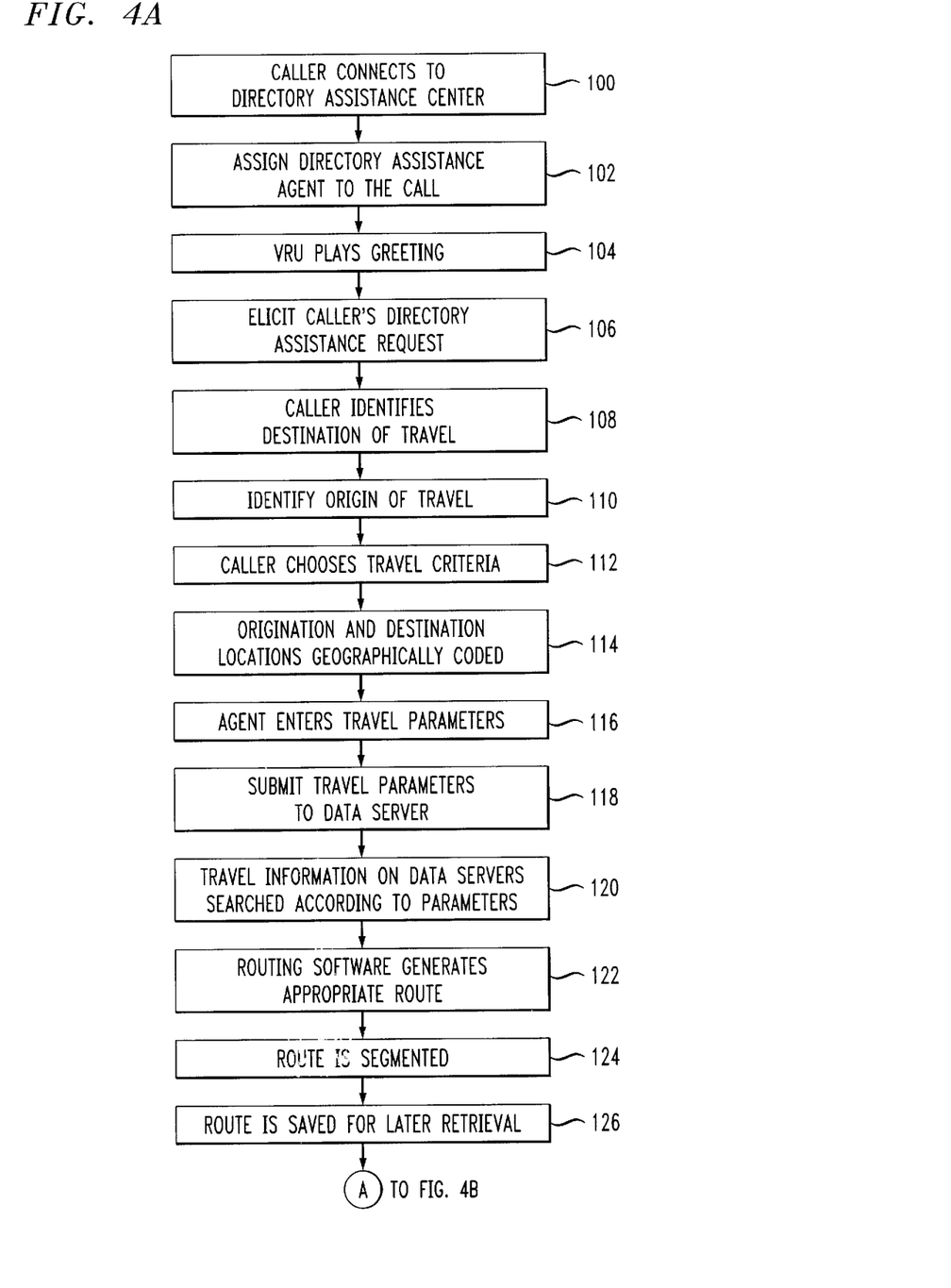
FIGS. 4A–4B comprise a flow chart depicting one method by which directional directory assistance is provided to a customer in accordance with one embodiment of the invention.
Figure 4B:
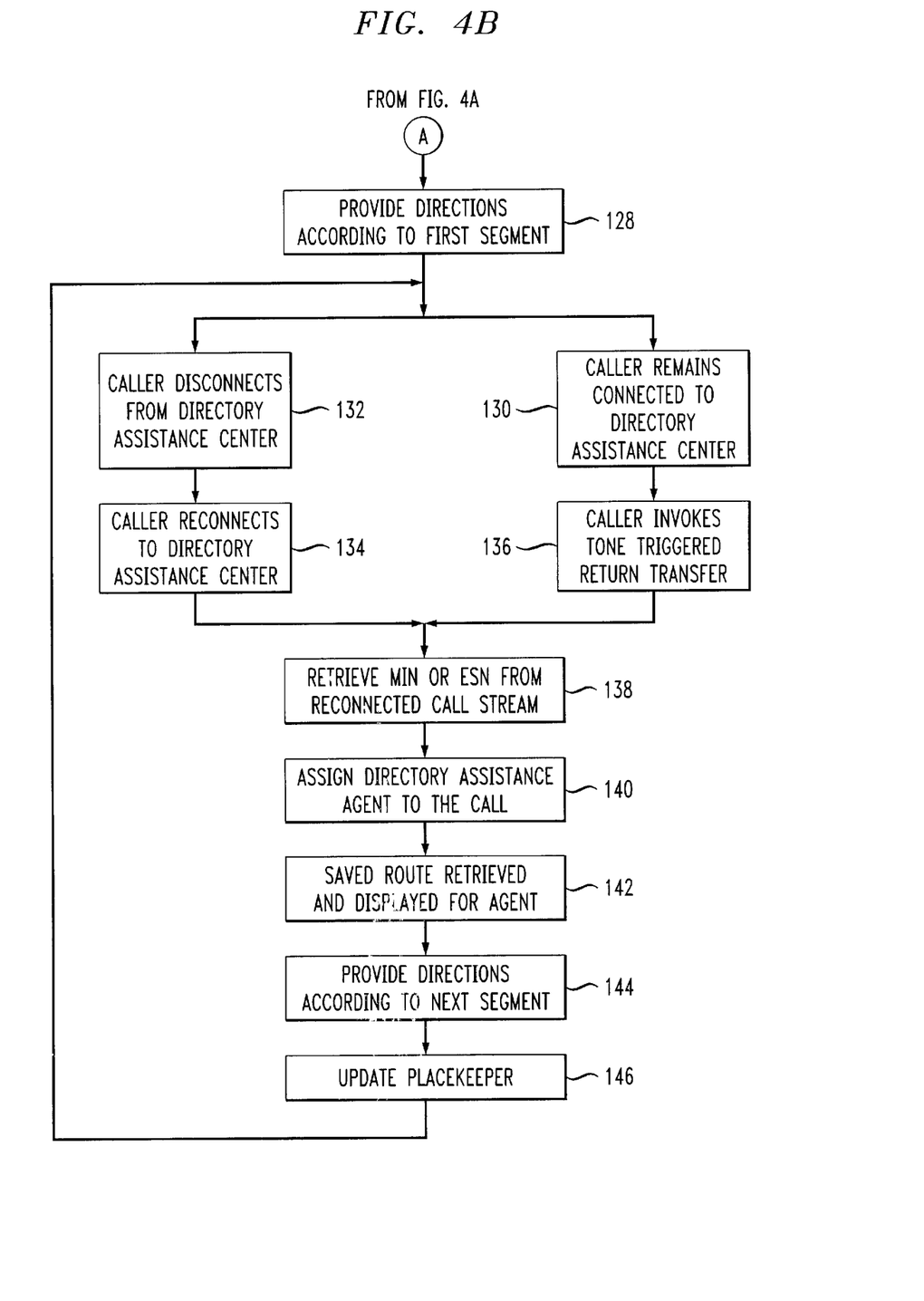

An illustrative method of providing directions to a directory assistance customer is depicted in FIGS. 4A and 4B. The caller connects (step 100) to directory assistance center 50 through MTSO 16 by dialing the appropriate access number. An operator is assigned (step 102) to the call in accordance with ACD logic. VRU 72 plays (step 104) its normal greeting and the operator elicits (step 106) the caller's directory assistance request. The caller requests travel instructions and identifies (step 108) a desired destination location. Steps 106 and 108 may be separate, as illustrated, in which case the operator must prompt the caller to identify his or her destination in step 108, or combined, such as when the caller simply states, for example, "I need directions to San Francisco" in step 106.

The origination point of the travel is identified (step 110), which may be the caller's present position or some other location if, for example, the caller is merely planning for a later trip and/or wants to verify the effectiveness of a route he or she already knows of. The origination may be a street address, an intersection, a landmark, etc., and may be identified verbally by the caller (perhaps in response to the operator's interrogation) or electronically according to a manner described above. The caller also specifies (step 112) any necessary or desired restrictions on the route or method of travel (e.g., most scenic route, shortest route, a particular point of interest to be visited along the route, desire to remain on major travel arteries, a desire to travel by train or boat, etc.).

The origination and destination locations are geographically coded (step 114) according to their corresponding entries in the geographic databases stored on data servers 66. The geographic codes are used by a routing algorithm, as described below, to generate a travel route. Illustratively, each geographic database contains codes for every street address and intersection within the city, cities or metropolitan areas within its geographic scope (or perhaps just the larger cities, towns, traffic arteries, etc.). The geographic codes may be located in the same or separate databases. If no geographic codes are presently assigned to the caller's destination or origination (where, for example, the caller lives on a new street or in a new housing development that was not previously coded), a new code is formulated and added to the database.

The origination, destination, and travel criteria are entered (step 116) into forms displayed on operator terminal 60 and completed by the operator. The forms are generated by data server 66.

When the form or forms are complete, the operator submits (step 118) them to data server 66 and a routing algorithm takes the information provided in the forms, searches (step 120) the geographic and travel data stored on data servers 66, and generates (step 122) an appropriate route. The route is segmented (step 124) as necessary and stored (step 126), along with a placekeeping reference, for easy retrieval (illustratively, the route is stored on data servers 66). The caller's MIN, or other unique electronic identifier (e.g., ANI, ESN) is also associated and stored with the route. A traveller identification may be generated, assigned to the travelling caller and stored with the route as well.

Segmentation of the route is, in the illustrated embodiment of the invention, performed according to the turns or changes in mode of travel the traveller must make (e.g., North on I-280, right on Fifth Avenue, board the Staten Island ferry, etc.), but the distance that the subscriber is willing to drive (if travelling via automobile) before desiring confirmation that he or she is on course may also be taken into account, as may other factors (e.g., the distance or time between turns, the complexity of the directions, whether the caller is able to retain all of the directions down at one time, whether the caller is familiar with the geographical area, whether the caller expects to require additional directory assistance along the route, etc.). For example, a portion of a route that entails a series of quick turns may comprise one segment (if the subscriber can comfortably remember the sequence of turns), while an extended period on one highway may be divided according to landmarks or planned convenience stops along the highway.

To expedite the route-generation process, data servers 66 store frequently-requested segments and routes of travel. When a caller requests directions between two points for which all or part of a route has previously been generated, the previous route can simply be retrieved. In this case, the route (or any segment thereof) is customized as necessary—either automatically by the routing algorithm (i.e., according to the new caller's travel criteria) or manually by the operator. The routes and segments for currently-travelling callers, regardless of how generated or derived, can be manually modified, at any time, by a human operator.

The placekeeping reference that is saved with the route is provided to the current operator and any subsequent directory assistance agents who assist the caller in his or her present travel. The reference is updated as segments of the route are provided to the caller, as described below.

A first segment of the route is then provided (step 128) to the subscriber, via the means specified as part of the travel criteria. By default, in the present embodiment directions according to the first segment are verbally provided by the same operator who elicited the travel information. In general, however, travel directions may be provided either visually (e.g., graphically) or via a series of instructions (e.g., text), or some combination of both, depending upon the mechanism through which the directions are supplied to the caller. Visual directions may be provided, for example, through a facsimile machine, a web browser, a computer, etc. Textual directions may be provided by facsimile, computer, SMS or other paging method, voice (from either an operator or VRU), etc.

As each segment of directions is provided to the caller, he or she travels accordingly. In the presently-described embodiment, the caller may remain connected (step 130) to directory assistance center 50 while travelling the segment, or may disconnect (step 132). The caller may choose to disconnect, for example, due to the length of the segment or because he or she will make a temporary stop. In either case, if the caller disconnects (step 132) the operator is released to handle other calls. If the caller remains connected to directory assistance center 50 (step 130), his or her call may-be parked or placed on hold until the next set of directions are required. Alternatively, and particularly for short trips or where the caller otherwise desires (such as when the caller is completely unfamiliar with the area being traversed or when the caller fears some danger or maintenance problem with his or her vehicle), the caller and operator may remain connected throughout the caller's trip.

When the caller is ready to receive additional instructions, he or she reconnects to a directory assistance agent by either redialing (step 134) directory assistance center 50 or invoking (step 136) the tone triggered return transfer feature described above. The directory assistance agent to whom the caller is reconnected may or may not be the same one that provided the previous segment of directions. Illustratively, however, the caller is returned to the same type of directory assistance agent (e.g., operator or VRU) that he or she last interacted with. If the caller simply needs, for example, the next segment of directions to be voiced, VRU 72 can quickly perform this function. When connected to VRU 72, a traveller illustratively interacts via a menu voiced by the VRU and chooses the appropriate action. However, a traveller who is interacting with VRU 72 can always connect to an operator by choosing the appropriate menu option or pressing a pre-specified key (such as the "#" key). A traveller may wish, for example, to connect to an operator rather than VRU 72 in order to re-generate a route and take into account a closed road or a desired detour.

By whichever method the caller reconnects, the caller's MIN is retrieved (step 138) from the call stream and data servers 66 search their stored travel routes for the MIN. If the MIN is found, then the reconnected call is forwarded (step 140) to an appropriate directory assistance agent with a notification that the caller is travelling; the stored travel route, with its place-keeper, is also forwarded. If the MIN is not found on data servers 66 among the active travel records, in this embodiment the call is treated as a new call to directory assistance center 50 and is handled accordingly.

In an alternative embodiment, wherein traveller identification numbers are assigned to callers, in step 138 the caller inputs his or her traveller identification number (e.g., via a keypad or voice input) or the device with which the caller is receiving directions transmits the number for the caller.

Returning to the embodiment depicted in FIGS. 4A–4B, the directory assistance agent retrieves (step 142) the caller's route of travel, with the placekeeping reference highlighted or centered on the operator's display, and provides (step 144) directions according to the next segment. Although the directory assistance agent continues at the point marked with the placekeeper, the agent has access to the entire route. The placekeeper is then updated (step 146) to point to the next segment. Steps 130–146 are repeated as necessary to guide the caller to his or her destination. The caller can, of course, connect to an operator at any time during the travel in order to receive directions corresponding to any segment of the route, not just the present one or the next one in sequence.

After the last segment is provided to the caller, he or she is notified that all directions have been provided. By default, the connection to the caller is then terminated unless the caller specifically requests otherwise. In a present embodiment, sometime after the final travel segment is provided to the traveller the caller's MIN, ANI, and/or traveller identification number is disassociated with the travel route. Therefore, after a period of time, calls from travelling subscribers are treated as fresh calls. In other words they are assumed to represent new requests for assistance instead of continuations of travel that should be completed. The delay period until this is done may be pre-determined (e.g., 30 minutes or twice the amount of time expected to traverse the final segment). In situations where the caller receives all of the travel segments at one time, disassociation of the caller's MIN from the route may be performed after twice the amount of time expected to travel the entire route, after a specific period of time after the route should be completed (e.g., one hour), etc.

Each travelling subscriber's route itself is illustratively stored for twice the amount of time estimated necessary for travelling between the origination and destination. In computing the necessary travel time, data server 66 may consider factors such as normal driving speeds, speed limits, detours, planned stops, etc. The expected travel time may be re-calculated each time the subscriber requests the next segment of directions. Although each traveller's customized route is only saved for a limited time, frequently travelled routes (or, alternatively, most or all routes) are stored in generic form (i.e., not customized according to any particular subscriber's desires) for rapid retrieval and customization for new travellers, as explained above.

As an optional safety feature, emergency personnel or a party specified by the caller may be notified by an operator if the travelling subscriber does not inform directory assistance center 50 that he or she has reached the desired destination within an appropriate amount of time. Illustratively, this service is requested at the time the caller places his or her initial directional assistance call to directory assistance center 50 (e.g., during step 112). The caller would, at that time, identify any medical conditions that emergency personnel should be aware of in the event the caller requires medical assistance and provide telephone numbers of relatives, friends, his or her doctor, etc.

Figure 5A:
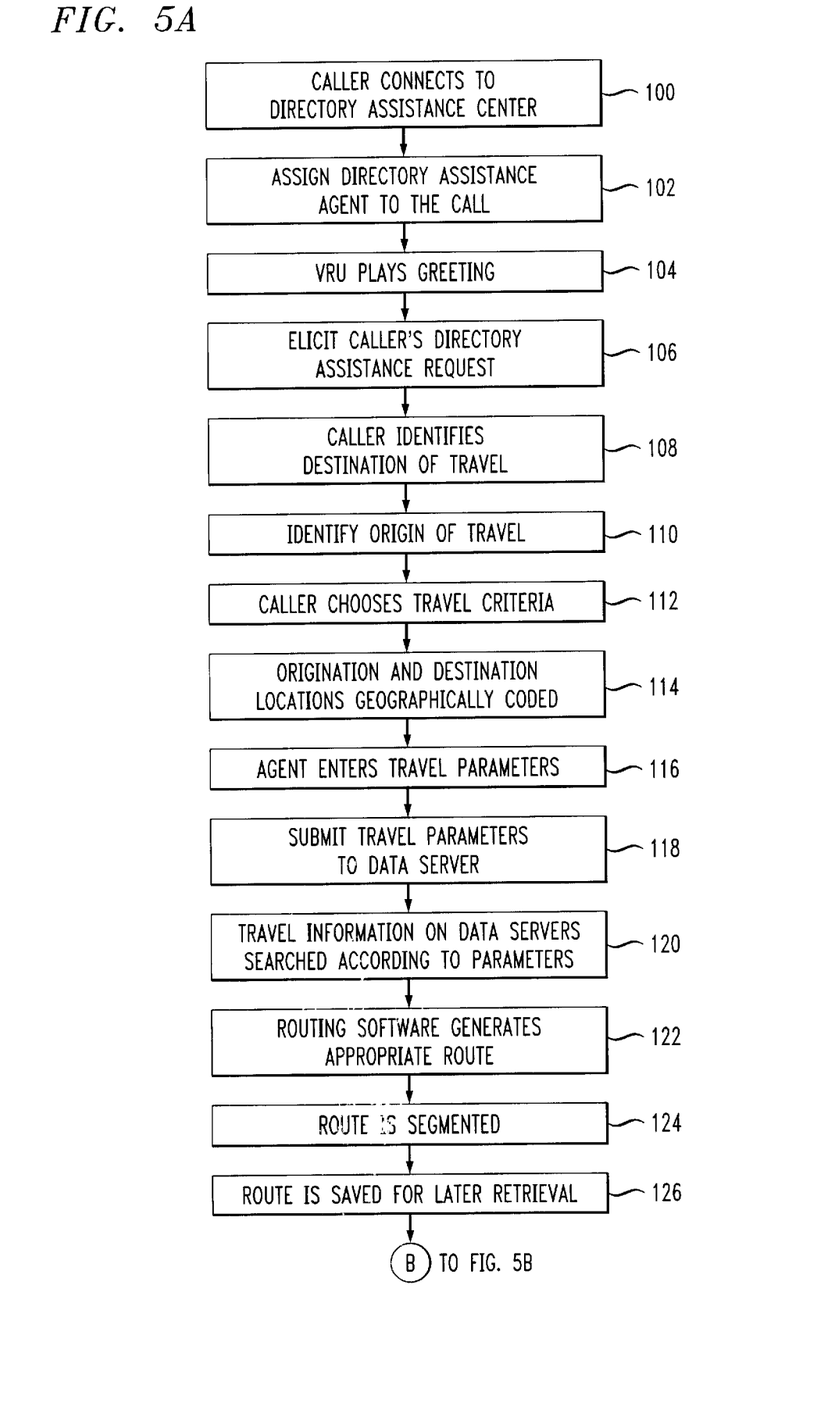
FIGS. 5A–5B comprise a flow chart depicting an alternative method of providing directional directory assistance system in accordance with another embodiment of the invention.
Figure 5B:
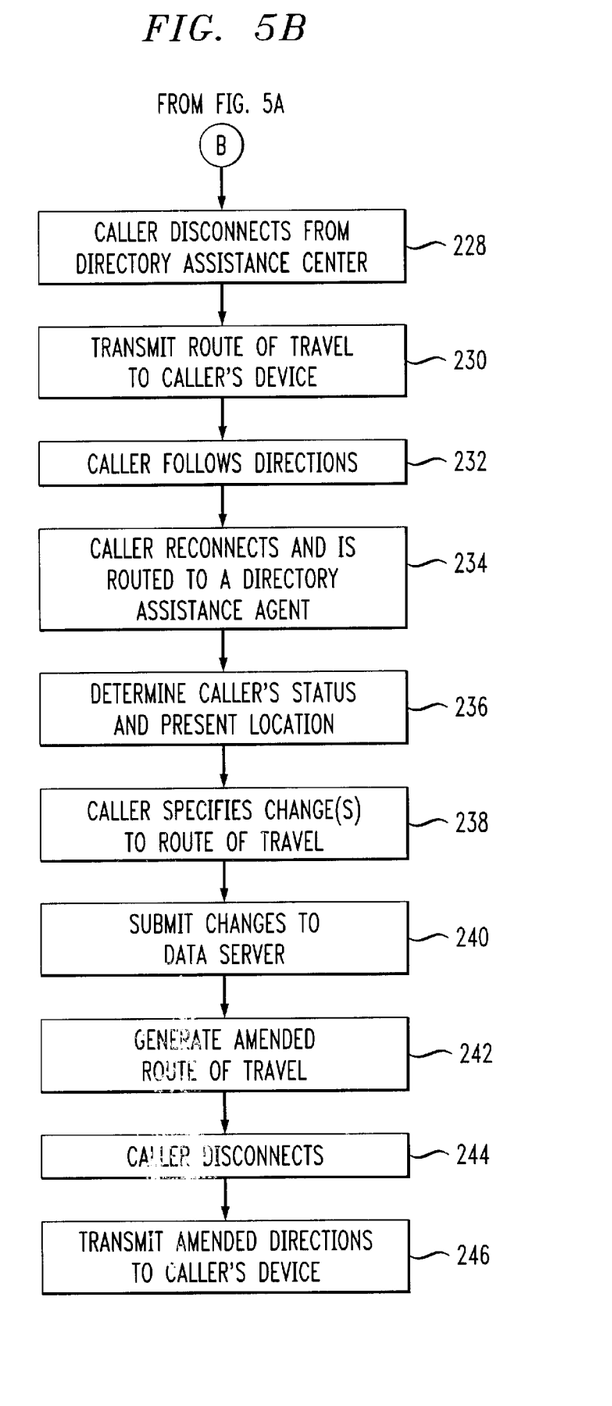

Referring now to FIGS. 5A and 5B, another embodiment of the present invention is described. In this embodiment, steps 100–126 mirror those in FIGS. 4A and 4B. Now, however, the caller disconnects (step 228) from directory assistance center 50 and the full route of the travel is transmitted (step 230) to the caller's palmtop computer or PDA (or other device equipped for receiving multiple segments of directions—such as a paging device, web browser, etc.) at one time. This download may be accomplished via any capable means of communications, such as SMS or other paging service, e-mail, internet broadcast, or "push" technology. Alternatively, the caller's telephonic connection to directory assistance center 50 is used to transmit the directions. In this alternative embodiment, the connection is not disconnected until after the route is transmitted.

The subscriber then follows (step 232) the downloaded directions and is able to access every segment, whether previous or subsequent to the segment currently being travelled. The subscriber may, for example, hear via a radio announcement during the course of his or her travel that a particular highway has been closed. He or she can look ahead in the planned route of travel to see if/how this affects his or her travel. Or, the caller may decide to alter the chosen route in order to visit an historical landmark or other point of interest.

When the caller decides, or it becomes necessary, to alter the planned route of travel, he or she reconnects (step 234) to directory assistance center 50 (by dialling the appropriate access digits) and is routed to a directory assistance agent. As described above, based on the caller's MIN, ANI, and/or traveller identification number, the agent is automatically informed (step 236) that the caller is receiving directional assistance, receives the caller's full route of travel. The agent also learns the caller's present location either from the caller or, as described above, from data received in the call stream or from an out-of-band transmission. The directory assistance agent may, for example, learn of the caller's present location by asking the caller or by resort to any of the means discussed for identifying a caller's initial location. If the caller is reconnected to VRU 72, one of the options offered by VRU 72 is to connect to a human operator.

The caller specifies (step 238) the changes he or she desires in the route; the directory assistance agent submits (step 240) the old route and new criteria or changes to data servers 66 and a new route of travel from the caller's present position is generated (step 242) by the routing software. The caller disconnects (step 244) and the directions are once again transmitted (step 246) to the caller's palmtop computer or other suitable device. Alternatively, again, the caller remains connected to directory assistance center 50 until after the directions are downloaded via the telephonic link.

In another embodiment of the invention, data server 66 is configured to notify a directory assistance agent of events that impact subscribers' planned routes of travel.

For example, traffic advisories may be processed on data server 66 to identify closed traffic arteries, unusual congestion, obstructions, inclement weather, etc. When notified of a significant event the directory assistance agent may call an affected subscriber and suggest an amended route. If the call is placed by a VRU, the caller is offered the opportunity to connect to an operator by pressing a specified key of his or her telephone or by voicing a pre-specified command.

In yet another embodiment of the invention, for use primarily when a caller is to travel a substantial distance, the caller may be connected to multiple, different, MTSOs and/or directory assistance centers. In this embodiment, as the caller travels from one MTSO's geographical area to another, his or her call is automatically switched to the MTSO serving the new area. In addition, the caller may interact with multiple directory assistance centers during his or her travel. In the event the caller's planned route of travel makes it more efficient or easier to pass the caller to another directory assistance center, the caller's route of travel (including travel criteria), the placekeeper, and the caller's MIN, ESN, and/or traveller identification number, are transmitted to or shared with the succeeding directory assistance center prior to the caller's connection to the new center. In this way, the provision of directions to the caller travelling a long distance is not adversely affected. The directory assistance center(s) with which a caller's travel data is to be shared may be selected in accordance with those MTSOs and/or directory assistance centers known to serve the geographical areas encompassing the caller's route of travel. Or, the travel data may automatically be shared with all directory assistance centers adjacent to the initial center and, when the caller connects to one of the adjacent centers during his or her travel, the travel data may then be shared with, or transmitted to, the centers adjacent to the new directory assistance center, and so on.

Billing Issues

There are generally three billing components of a call to a directory assistance service from a wireless telephone according to the present invention:

1) "Air time," or the total time the caller uses the wireless carrier's system to carry a call from his/her wireless telephone. This is the responsibility of the carrier.

2) The charge levied for use of the directory assistance service. For calls requesting "basic" directory assistance, i.e., identification of or connection to a desired party, this charge may be made by the directory assistance service to the wireless carrier on the basis of the number of calls received from the carrier in a particular time period.

However, billing is more complicated when directory assistance center 50 provides enhanced directory assistance in the form of providing directions to travelling subscribers. In a present embodiment, a flat charge is assessed for initially connecting to directory assistance center 50, identifying the origination and destination points, gathering any travel criteria, generating an appropriate route, and providing either a first segment or the full route of travel instructions. When additional instructions must be provided (e.g., additional or altered segments), however, further charges may accrue—the total amount being dependent upon the method and form of delivery.

Different costs are assessed based upon whether the directions are given in electronic, hard-copy, or voice format (and, if voiced, whether by a VRU or an operator). For electronic and hard-copy formats, the cost also depends on whether they are visual or textual in nature. The total charge also depends upon whether electronically-provided directions are delivered by paging, facsimile, network, etc.

Finally, in the embodiment pictured in FIGS. 4A and 4B, if the subscriber chooses to remain connected to directory assistance center 50 after directions according to each segment are provided, a charge is assessed per unit of time the call is kept parked or on hold.

3) Toll charge—the charge levied by a carrier for the duration of an answered connection over a toll route originated by a directory assistance agent. This charge is levied by the carrier used for completion of customer calls originated by the directory assistance agent. The wireless carrier is dependent on the directory assistance service to provide enough details of these calls to enable it to accurately bill its subscribers accordingly. There are two ways of doing this:

A) The directory assistance service provides "tickets" of all calls that were transferred and answered. The precise content and format of the ticket is customer-defined, but includes at least the following information: calling number, called number, date and time of connection (i.e. when answer indication was received), and duration of call. The ticket files can be transferred on magnetic tape or by means of electronic file transfer.

B) The digits that are dialed by the directory assistance service's switch to initiate the call transfer (via the wireless carrier's network) can incorporate the calling party number (Automatic Number Identification, or ANI). The wireless carrier's own switching equipment then has all the information needed to generate the required tickets.

Having described the principles of our invention with reference to an illustrative embodiment and certain variations thereon, it should be apparent that these examples can be modified in arrangement and detail without departing from such principles. For example, while the invention has been illustrated with reference to a system in which a tone triggered return transfer customer is routed back to the next available operator, in other embodiments, provision can be made for routing the customer back to the original operator. (In some systems, the customer can be given a choice: pressing one key or voicing one command for the first available operator, and another key or another command to be returned to the original operator.)

In view of the many possible embodiments to which the principles of our invention may be put, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A method for use in a system for communicating to a user directions to a location through successive communication connections, the method comprising:

planning a route to reach the location;

dividing the planned route into a plurality of segments thereof in accordance with at least one predetermined criterion;

providing a first segment of the planned route to the user through a first communication connection; and carrying out the following (a)–(e) with or without repetition thereof:

(a) storing at least the planned route including the segments thereof in association with an identifier identifying the user;

(b) establishing a second communication connection with the user;

(c) receiving the identifier through the second communication connection;

(d) retrieving the planned route including the segments thereof based on the received identifier; and (e) providing a second segment of the planned route to the user through the second communication connection.

2. The method of claim 1 wherein at least one of the communication connections is established by the user using a telephone, the identifier including a telephone number of the telephone.

3. The method of claim 2 wherein the telephone number is derived from data in a call stream in establishing the at least one communication connection.

4. The method of claim 1 further comprising storing, along with the planned route, a reference for indicating a segment lastly provided to the user.

5. The method of claim 1 wherein the predetermined criterion concerns a predetermined length of time estimated to travel each segment.

6. The method of claim 1 wherein the predetermined criterion concerns changes in direction in traveling the planned route.

* * * * *